United States Patent
Mohindra

(10) Patent No.: US 7,532,873 B2
(45) Date of Patent: *May 12, 2009

(54) DC OFFSET CANCELLATION IN A ZERO IF RECEIVER

(75) Inventor: Rishi Mohindra, Milpitas, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 11/454,089

(22) Filed: Jun. 14, 2006

(65) Prior Publication Data

US 2006/0246842 A1 Nov. 2, 2006

Related U.S. Application Data

(63) Continuation of application No. 10/235,222, filed on Sep. 5, 2002, now Pat. No. 7,110,734.

(51) Int. Cl.
*H04B 1/06* (2006.01)
*H04B 7/00* (2006.01)

(52) U.S. Cl. .................... 455/234.1; 455/250.1

(58) Field of Classification Search ........... 455/234.1, 455/234.2, 241.1, 245.1, 250.1, 253.2, 63.1, 455/67.13, 324, 340

See application file for complete search history.

(56) References Cited

U.S. PATENT DOCUMENTS

| | | | |
|---|---|---|---|
| 3,953,805 A | 4/1976 | Couvillon | |
| 5,715,281 A | 2/1998 | Bly et al. | |
| 5,724,653 A | 3/1998 | Baker et al. | |
| 5,757,299 A * | 5/1998 | Noro et al. | 341/143 |
| 5,982,235 A | 11/1999 | Kinomura | |
| 5,982,807 A | 11/1999 | Snell | |
| 6,075,409 A * | 6/2000 | Khlat | 329/304 |
| 6,240,100 B1 | 5/2001 | Rjordan et al. | |
| 6,324,389 B1 | 11/2001 | Vaisanen | |
| 6,442,380 B1 | 8/2002 | Mohindra | |
| 6,509,777 B2 * | 1/2003 | Razavi et al. | 327/307 |
| 6,700,514 B2 * | 3/2004 | Soltanian et al. | 341/118 |
| 6,735,422 B1 | 5/2004 | Baldwin et al. | |
| 6,771,945 B1 * | 8/2004 | Pickett et al. | 455/324 |
| 7,024,221 B2 * | 4/2006 | Paulus et al. | 455/553.1 |
| 7,110,734 B2 * | 9/2006 | Mohindra | 455/234.1 |
| 2002/0097081 A1 | 7/2002 | Razavi et al. | |
| 2002/0197975 A1 | 12/2002 | Chen | |
| 2003/0156668 A1 | 8/2003 | Atkinson et al. | |
| 2006/0217069 A1 * | 9/2006 | Chen et al. | 455/63.1 |

FOREIGN PATENT DOCUMENTS

WO    WO 01/47105 A2    6/2001

* cited by examiner

*Primary Examiner*—Duc M Nguyen
(74) *Attorney, Agent, or Firm*—Haverstock & Owens LLP

(57) ABSTRACT

This invention describes how to quickly cancel DC offsets that are present in the two quadrature paths of a zero intermediate frequency transceiver. Previously known techniques are not suitable for the 5 GHz WLAN standards because of the very short transmit to receive turn around times and extraordinarily large DC offsets in these systems. This invention solves the above problems. The present invention uses both AC and DC coupling along with automatic gain control techniques to remove unwanted DC offsets within an acceptable time period. The invention further uses a digital signal processor to estimate and subtract out the DC offset errors using time averaged signals. The digital signal processing circuit is capable of further AC filtering and Analog to Digital conversions.

25 Claims, 3 Drawing Sheets

DC OFFSET CANCELLATION IN A ZERO IF RECEIVER

CROSS REFERENCE TO RELATED APPLICATION

This application is a continuation of co-pending U.S. application Ser. No. 10/235,222, filed Sep. 5, 2002 now U.S. Pat. No. 7,110,734 which is incorporated herein by reference in its entirety.

BACKGROUND OF INVENTION

The invention relates to a method and apparatus for correcting DC offset problems found in high-speed transceiver systems.

Conventional transceiver systems commonly must switch back and forth between transmit and receive modes. As the speed of data transmission increases, the time allowed for switching between the Transmit (Tx) and Receive (Rx) modes becomes smaller. One conventional type of receiver is known as a Direct Conversion zero intermediate frequency (IF) receiver. In this type of receiver a local oscillator is tuned to the carrier frequency of the incoming signal. These types of receivers commonly have multiple stages in which the incoming signal is down converted and processed using a local oscillator (LO) circuit. These IF type receivers create in phase (I) and 90 degrees out of phase quadrature (Q) signals from the received signal. Large DC offsets are produced in the down converter outputs of Zero IF receivers due to LO leakage at the RF ports of the down converters. Additional DC offsets exist along the I and Q paths that include low-pass channel filters and automatic gain control (AGC) circuits with large gains. Therefore each of these DC coupled stages introduces a DC offset error into the signal. In an orthogonal frequency division multiplexing (OFDM) system, a difference between the local oscillator (LO) frequency and the incoming signal frequency causes DC offset errors within the system to profoundly degrade the SNR after demodulation. These unwanted DC errors may also cause the amplifiers used in the I and Q branches to saturate. Once the amplifier is in a saturated state, the received data signal cannot be processed and amplified correctly so the received data signal is lost.

Prior art attempts to deal with the above problems have been only semi-successful. Stroet et al.'s article entitled "A Zero-IF Single Chip Transceiver for up to 22 Mb/s QPSK 802.11b Wireless LAN" shows that these offset errors may be reduced or settled in 25 microseconds. The reduced DC offset is still too high for OFDM systems and takes too long to settle. As mentioned above, with an increase in data speeds, this prior art system is not useable in today's transceiver environments.

All known prior art techniques used to reduce these DC offset errors have drawbacks in one form or another. For example, AC coupling signals with high frequency cut off values may reduce response time, but has an unacceptable signal to noise ratio or an unacceptable effect on the signal itself. Further, automatic gain control is also only useable when the DC offset level is very small. The end result is that these DC offset values can not be reduced in an acceptable amount of time.

SUMMARY OF THE INVENTION

The instant invention uses an automatic gain controller AGC and a digital signal processor along with zero IF transceiver circuitry to create I and Q signals to process and remove DC offset signals in acceptable time periods. Using a combination of techniques such as AC and DC coupling, automatic gain control, and digital signal processing, the DC offsets are removed to insignificant levels. The main features or steps of the invention are: 1) dynamically changing the cut off frequency of an AC coupling stage; 2) computing a DC signal error over a time period in which the I and Q signals complete a single or multiple cycles, 3) subtracting the estimated DC errors from the I and Q signals, and 4) high-pass filtering the resultant signal so that residual DC errors are removed. The implementation and timing of these steps allows for DC offset control that is far superior to prior art systems.

In a second embodiment a D/A converter is used in each of the I and Q branches to significantly reduce the DC offset, and then steps 2-4 as mentioned above are followed. The DSP does a coarse DC correction with the D/A converter, and maintains a list of correction values for all combinations of antenna diversity, LNA amplifier gains and AGC gains. This ensures that DC offset correction values are maintained for all combinations of antenna diversity and low noise amplifier gains. In the second embodiment, the DSP controls the system so that the DC offset error is reduced when AGC gain is reduced.

In a third embodiment, the transceiver frequency error is further removed in the receiver by changing the voltage controlled oscillator crystal (VCXO) frequency that is used for the local oscillator (LO) frequency synthesizer. This also ensures that the effect of the DC offset error is minimized after demodulating an OFDM signal.

DETAILED DESCRIPTION OF THE INVENTION

Using a combination of techniques such as AC and DC coupling, automatic gain control, and digital signal processing, the DC offsets are removed to insignificant levels. The main features or steps of the invention are dynamically changing the cut off frequency of an AC coupling stage; computing a DC signal error over a time period in which the I and Q signals complete a single or multiple cycles, subtracting the estimated DC errors from the I and Q signals, and high-pass filtering the resultant signal so that residual DC errors are removed. The implementation and timing of these steps allows for DC offset control that is far superior to prior art systems.

In a second embodiment a D/A converter is used in each of the I and Q branches to significantly reduce the DC offset, and the steps as mentioned above are followed. The DSP does a course DC correction with the D/A converter, and maintains a list of correction values for all combinations of antenna diversity and LNA amplifier gains. This ensures that DC offset correction values are maintained for all combinations of antenna diversity and low noise amplifier gains. In the second embodiment, the DSP controls the system so that the DC offset error is reduced when AGC gain is reduced.

In a third embodiment, the transceiver frequency error is further removed in the receiver by changing the voltage controlled oscillator crystal (VCXO) frequency that is used for the local oscillator (LO) frequency synthesizer. This also ensures that the effect of the DC offset error is minimized after demodulating an OFDM signal.

Figure 1:
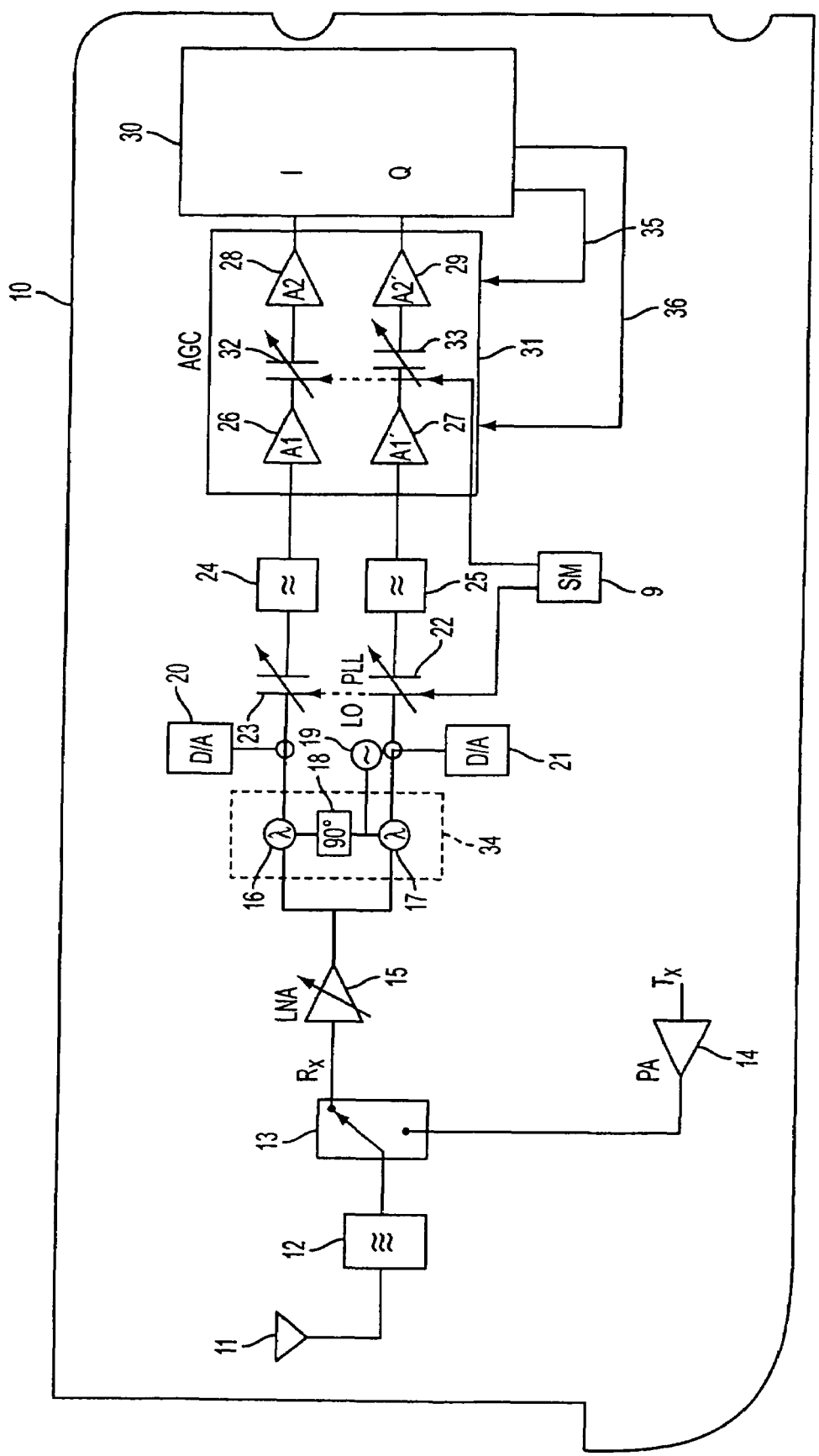
FIG. 1 shows the transceiver circuit of a first and second embodiment of the present invention.

FIG. 1 shows a diagram of the transceiver 10 as a zero intermediate frequency radio device according to the present invention. The transceiver 10 comprises a receive branch Rx and a transmit branch Tx. A transmit power amplifier 14 is coupled to a Tx/Rx switch 13. The Tx/Rx switch 13 is coupled to an antenna 11. The transmitting branch is well known in the art and is not shown in detail here. The receiver branch further includes a variable gain low noise radio frequency amplifier (LNA) 15 that is coupled to the Tx/Rx switch 13. The LNA 15 amplifies an input signal that corresponds to an incoming radio frequency signal that is received by the antenna 11.

The output of the LNA 15 is coupled to a frequency down converter 34 for down converting the radio frequency signal to a zero intermediate frequency (IF) signal. The present invention employs a quadrature frequency down converter. The frequency down converter 34 which contains mixers 16 and 17 in respective quadrature and in-phase mixer paths that provide filtered and amplified quadrature signals Q and I. The frequency down converter 34 further includes controllable AC couplers 22 and 23, and channel filters 24 and 25. The AC couplers 22 and 23 are coupled between the mixers 16 and 17 and the zero IF amplifiers filters 24 and 25.

Control signals for the automatic gain control AGC 31 are provided by a DSP baseband processor 30. The baseband processor 30 contains processing means for providing cut-off frequency control signals and signals to the AGC unit 31. Signal line 35 controls the automatic gain controlling data, while signal line 36 contains frequency cutoff information. Also shown is a State Machine 9. The State Machine 9 is connected to capacitors 22-23 and 32-33. The State Machine is used to change the AC coupling frequency from 10 MHz to 500 KHz as will be explained in greater detail below. The operation and functions of the DSP 30 will also be described in detail with reference to FIG. 2 below.

In another embodiment, the baseband circuit 30 further employs analog to digital converters 20 and 21 for canceling the DC offset in the quadrature signals I and Q. The sampled I and Q DC correction signals are supplied by the digital signal processor (DSP) 30.

Figure 3:
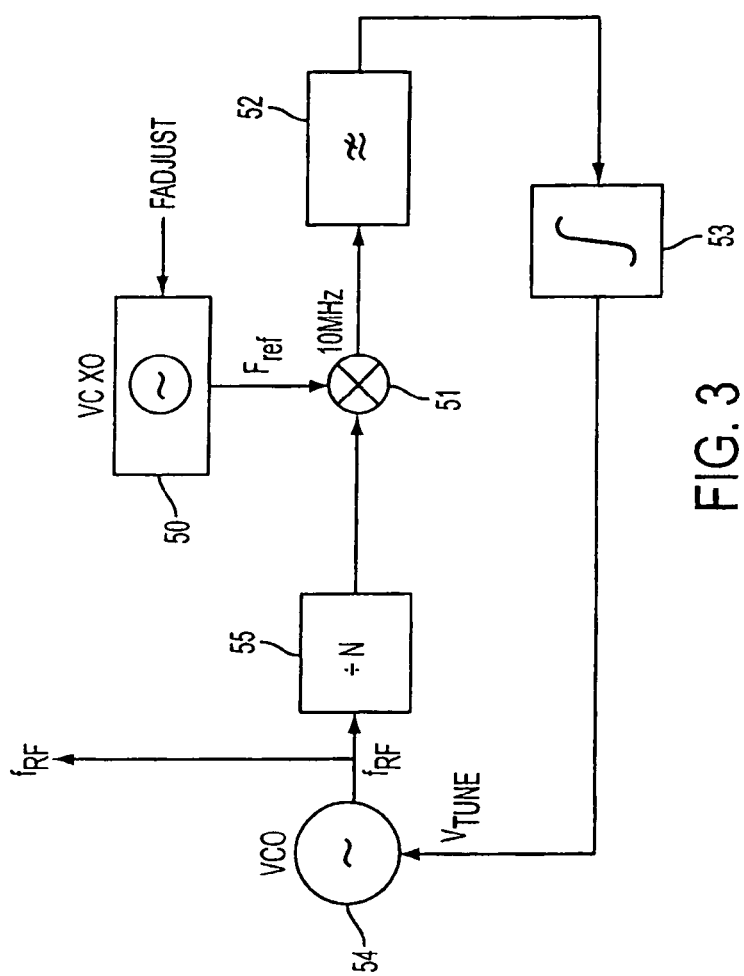
FIG. 3 shows a frequency adjust circuit employed in a third embodiment of the invention.

The transceiver 10 further comprises a PLL 19 for generating local oscillator signals for the receive branch Rx and for the transmit branch Tx. As is well known in the art, the PLL comprises a voltage controlled oscillator (VCO), a loop filter, and an integrator. A reference oscillator signal, as shown in more detail in FIG. 3, is supplied to the PLL. In order to generate the I and Q signals, a ninety degrees phase shifter is used in conjunction with the LO signals that are fed to the mixers 16 and 17. The transceiver 10 does not use the D/A converters in the first embodiment but does employ them in a second embodiment.

As described above, the problems with prior art transceiver systems are the unwanted DC offset values that are produced by the system components.

Figure 2:
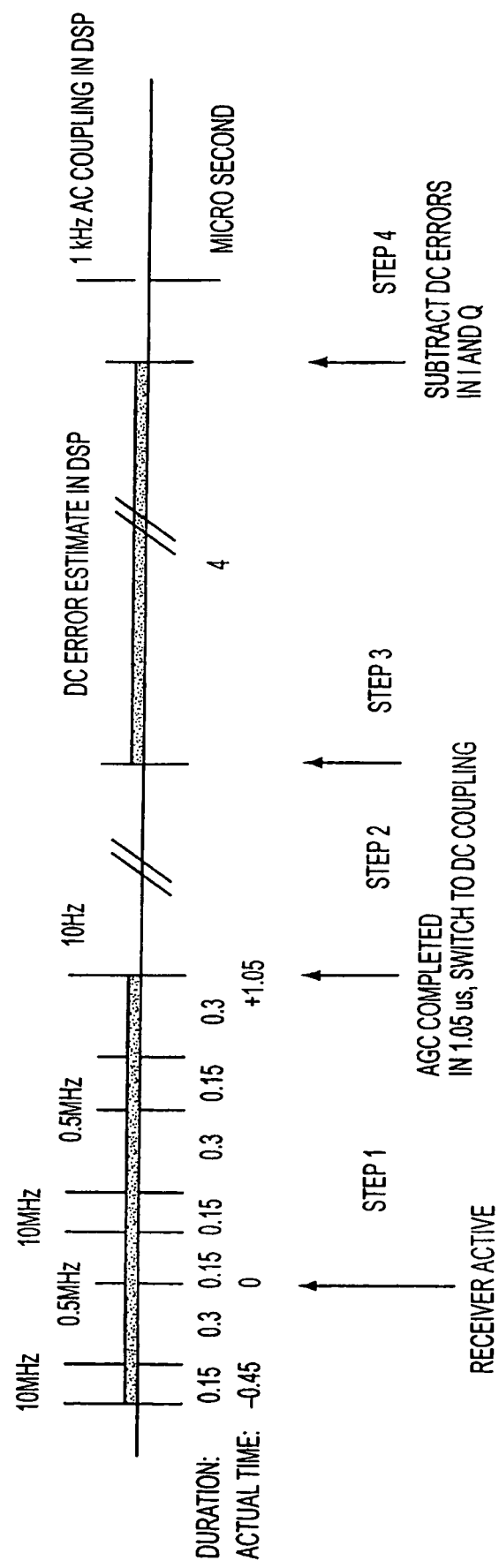
FIG. 2 shows a timing diagram of the present invention.

FIG. 2 shows a timing diagram according to one preferred embodiment of the invention. This timing diagram shows the durations of the AC and DC coupling stages necessary to reduce the DC offset errors. Also shown in FIG. 2 are the lower cut off frequencies of the filters during these AC coupling stages.

The invention implements both AC and DC coupling in the receiver I and Q base band paths. Temporary AC coupling is used to remove DC offsets that could otherwise saturate the receiver outputs due to the large gain in the base band paths from the down converters outputs to the I and Q outputs. The AC coupling is implemented as a cascade of one or more first order high pass filters 24 and 25, with a particular lower 3 dB cut off frequency (f lower).

With reference to FIG. 2, upon entering the receive (RX) mode at time zero, (step 1) the AC coupling cutoff frequency (f lower) is momentarily kept at 10 MHz for 0.15 usec. This is done automatically by a state machine 9 in the receiver. This quickly removes all the DC offset in the receiver I and Q base band paths. After 0.15 microseconds (f lower) is automatically reduced to 500 kHz, and remains at this cut off value until the DSP removes the AC coupling and introduces DC coupling. With the 500 kHz AC coupling, DC offset changes (with AGC gain changes) are quickly removed before the signal is sampled or the next AGC iteration. It is during this stage of step 1 that automatic gain control is performed on the signal. The gains of amplifiers 26,27,28 and 29 are changed by the DSP to adjust the IQ signals to a desired level at the A/D input. FIG. 2 shows 3 distinct time periods of adjustment, however more periods could be used as necessary. In the example shown in FIG. 2, the DC coupling (step 2) is switched on at 1.05 microseconds.

The DC coupling is actually an AC coupling with a very low value of (f lower) which is less than 100 Hz. With such a low cut off frequency, it may be considered DC coupling even for long IEEE802.11a data packets that may be up to 5-6 milliseconds in duration.

It should be noted that whenever the LNA 15 gain is changed, there is a change in logic level at the antenna select input, and the state machine 9 changes (f lower) to 10 MHz for 0.15 microseconds and then returns (f lower) to 500 kHz.

It should also be noted that when the state machine 9 changes (f lower) from 10 MHz to 500 kHz, there is a step in the I and Q DC levels that may be as large as the peak signal level. This step quickly decays away to very low levels within about 0.8 microseconds. Simulations show that with 500 kHz AC coupling for IEEE802.11a, if a moving average signal power estimate is computed by the DSP 30 (averaged over 0.8 microseconds), then the error is within 2 dB after the first 0.8 microseconds of the RF burst. For a coarse signal level estimate, a 150 nanosecond averaging window (samples at 40 or 80 MHz A/D) is sufficient.

When the DSP 30 changes the receiver base band AGC gain in step 1, it must wait for up to 300 nanoseconds before sampling the I and Q signals for computing the signal power. This is because of the transient settling of the receiver AGC DC levels that takes less than 300 nanoseconds to settle for a 500 kHz AC coupling. For small changes in AGC gain settings, the transient settling time is less than 300 nanoseconds. All changes in LNA and AGC gain settings should be done in order to get the proper signal level and allow the DC errors to be removed before making the decision for the next gain setting.

After finally adjusting the receiver AGC gain, the DSP 30 changes the receiver paths to DC coupling (step 2). When this is done, there is a small change in the I and Q DC levels, and it can not be avoided. It is less than about −5 dB relative to the peak signal level and is due to the AC coupling acting on the signal itself (not related to the actual DC error in the circuit). This DC error remains nearly constant during the rest of the receive burst that may be up to 6 ms long. In this preferred embodiment, this static DC error should be removed digitally by the DSP 30, only after the I and Q A/D conversion takes place. This will ensure not to degrade the signal to noise ratio (SNR) after the fast Fourier transform (FFT) in the receiver, especially when there are large relative frequency offsets between the Transmitting and Receiving modes in the transceivers.

In step 3 of the preferred embodiment the DSP 30 computes the DC offsets in the I and Q remaining parts of the signal. The average values of the I and Q signals are calculated by the DSP 30. The computed average DC offsets should then be subtracted from their respective signals for the rest of the packet. It is important to calculate the DC offset error at this point while the signal is DC coupled, so as to get an accurate indication of the offset error. After this subtraction, a first order high pass filtering should be done on the following I and Q signals digitally by the DSP 30, which represents step 4 of the preferred embodiment. This process significantly improves the SNR of the signal. This is because the estimated DC offset is not the true DC offset when the transmitter-receiver frequency offset is present. A residual DC error remains and it must be removed. Simple high pass digital filtering in the DSP 30 is sufficient. A lower cutoff frequency of 1 kHz is optimum for this digital filtering.

This process as shown in FIG. 2 allows the DC offset error to be reduced to acceptable levels within 8 microseconds. In this preferred embodiment it is assumed that the DSP 30 takes 150 nsec to compute the signal power and program the AGC. Actual time for worst case AGC setting will depend on the exact processing delay of the DSP, and the total number of AGC set iterations, and whether or not antenna diversity is used.

In another preferred embodiment, instead of computing the DC error in the DSP and subtracting it, the DSP can instead ramp down the value of (f lower) the AC coupling cut off frequency, from 500 kHz to less than 100 Hz over about 4 microseconds. This avoids the sudden step in DC offset that is associated with abruptly changing the cut off frequency.

FIG. 3 shows a third embodiment of the present invention, wherein a frequency adjust signal is applied to the voltage controlled crystal oscillator 50 to change the frequency of the LO. A signal (F adjust) is applied to the voltage controlled crystal 50 from the DSP controller. The phase locked loop contains conventional components such as a charge pump multiplier 51, a low pass filter 52, an integrator 53 and voltage controlled oscillator 54. The function of this circuit shown in FIG. 3 is to ensure that the frequencies of the local and received carriers are the same. When the frequency error is significantly reduced, even a large DC offset does not degrade the SNR after demodulation of the OFDM signal. Therefore the DC estimation and subtraction, and removal of residual DC error, is not required.

Figure 4:
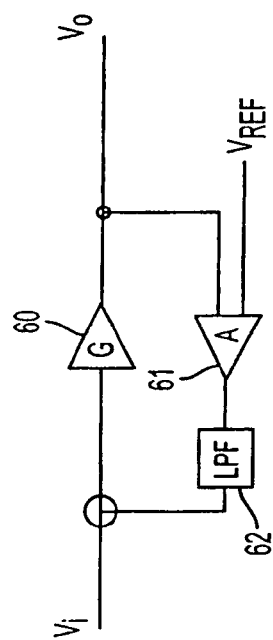
FIG. 4 shows one embodiment of an automatic gain control circuit of the present invention.

FIG. 4 shows one embodiment of how the automatic gain control circuit (AGC) and AC coupling may be implemented. This feedback circuit contains two amplifiers 60 and 61 with respective gains of G and A respectively. A low pass filter (integrator) 62 is also added after the feedback amplifier 61. This type of connection allows the transfer function from input to output to be frequency dependent. By changing the gains of the amplifiers 60 and 61, the cutoff frequency of this circuit may be varied. The $-3$ db lower cutoff frequency of the AC coupling is 2piAG. The product of AG must be maintained constant when changing the signal path gain G, in order to keep a constant cutoff frequency. In this manner automatic gain control may be implemented while keeping a constant lower cut-off frequency. As mentioned above the AC coupling provided by this circuit may be effectively changed to DC coupling by making the value of A very small, so that 2piAG is less than 100 HZ.

In view of the foregoing, it will be evident to a person skilled in the art, what various modifications may be made in the embodiments given, such as digital signal processing, gain control, channel filtering, and reduction of cut off frequencies. Further the invention is thus not limited to the examples provided.

It is claimed:

1. A single chip integrated transceiver suitable for IEEE 802.11 applications, said transceiver comprising:
    a single-ended input low noise amplifier (LNA) having an LNA input and an LNA output;
    a quadrature mixer coupled to said LNA output, said quadrature mixer generating signals I and Q at first and second quadrature mixer outputs;
    a first controllable AC coupler having a first controllable AC coupler input coupled to said first quadrature mixer output, and a first controllable AC coupler output;
    a first channel filter having a first channel filter input coupled to said first controllable AC coupler output, and a first channel filter output;
    a second controllable AC coupler having a second controllable AC coupler input coupled to said second quadrature mixer output, and a second controllable AC coupler output;
    a second channel filter having a second channel filter input coupled to said second controllable AC coupler output, and a second channel filter output;
    an automatic gain control (AGC) having first and second AGC inputs, and first and second AGC outputs, wherein said first AGC input is coupled to said first channel filter output, and said second AGC input is coupled to said second channel filter output;
    a baseband processor coupled to said AGC;
    wherein during a first step of receiver signal processing, said baseband processor provides cut-off frequency control signals for said first and second controllable AC couplers such that said first and second AC couplers apply AC coupling at a first frequency for a first period of time, and said first and second AC couplers apply AC coupling at a second frequency for a second period of time, and further wherein said baseband processor provides signals for controlling said AGC;
    wherein during a second step of receiver signal processing, said baseband processor employs digital to analog converters coupled to said first and second controllable AC coupler inputs to cancel at least some DC offset present in said I and Q signals;
    wherein during a third step of receiver signal processing, said baseband process digitally filters said I and Q signals to reduce DC offset present in said I and Q signals, wherein the DC offset is estimated during a DC coupling.

2. A transceiver as recited in claim 1, wherein said LNA is a variable gain LNA.

3. A transceiver as recited in claim 1, wherein said first frequency is about 10 MHz.

4. A transceiver as recited in claim 1, wherein said second frequency is about 500 kHz.

5. A transceiver as recited in claim 1, wherein said first frequency is about 10 MHz and said second frequency is about 500 kHz.

6. A transceiver as recited in claim 1, wherein said first and second frequencies are two of a plurality of frequencies used to step down said cut-off frequency.

7. A transceiver as recited in claim 1, wherein during a fourth step of receiver signal processing, said baseband processor estimates DC offsets in said I and Q signals and subtracts said estimated DC offsets from respective I and Q signals, said fourth step typically performed prior to said third step.

8. A transceiver as recited in claim 1, wherein said transceiver is a 2.4 GHz-band transceiver.

9. A transceiver as recited in claim 1, wherein said transceiver is a 5 GHz-band transceiver.

10. A transceiver as recited in claim 1, said transceiver further comprising a transmitter.

11. A transceiver as recited in claim 10, said transceiver further comprising a phase-locked-loop (PLL) having a loop filter.

12. A transceiver as recited in claim 11, wherein said PLL further includes a voltage controlled oscillator (VCO) and an integrator, said PLL used to substantially synchronize frequencies of received and local data carrier signals.

13. A method for reducing DC offset error in a transceiver used for 802.11 applications, the method comprising:
    applying AC coupling to a received data signal, wherein a coupling frequency is ramped down in at least two steps;
    performing automatic gain control on said received data signal;
    estimating said DC offset error using a digital signal processor during DC coupling of the received data signal; and
    substantially removing said estimated DC offset error from said signal.

14. A method for reducing DC offset error as recited in claim 13 further comprising:
    filtering said received signal to remove DC offset error.

15. A method for reducing DC offset error as recited in claim 14 wherein filtering said received signal to remove DC offset error is performed digitally after the other acts have been completed.

16. A method as recited in claim 13, wherein said coupling frequency utilizes cut-off frequencies of about 10 MHz and 500 kHz.

17. A method as recited in claim 13, wherein said coupling frequency utilizes cut-off frequencies of about 10 MHz and less than 1 MHz.

18. A transceiver device wherein a receive path of said transceiver device comprises:
    a low noise amplifier (LNA); and
    a frequency down converter that dynamically changes cut off frequencies of AC coupling and performs automatic gain control to remove DC offset, performs DC coupling to estimate and remove DC offset error, and performs digital filtering to remove DC offset error.

19. A transceiver device as recited in claim 18, wherein said frequency down converter has a stage of operation that estimates and subtracts DC signal errors.

20. A transceiver device as recited in claim 19, wherein said frequency down converter includes a digital signal processor that controls said cut off frequencies of said AC coupling, controls said DC coupling, and performs said digital filtering.

21. A transceiver device suitable for IEEE 802.11 applications, wherein said transceiver device comprises:
    a receiver including:
    a single-ended low noise amplifier (LNA);
    a frequency down converter coupled to said LNA, wherein said frequency down converter dynamically changes cut off frequencies of AC coupling and performs automatic gain control during a first stage, estimate a DC offset error while performing DC coupling during a second stage, and performs high pass DC filtering during a third stage;
    a phase locked loop with a loop filter for synchronizing frequencies of received and local data carrier signals; and
    a transmitter.

22. A transceiver as recited in claim 21, wherein said frequency down converter estimates and subtracts DC signal errors during another stage of operation.

23. A method to reduce DC offset errors in a zero intermediate frequency transceiver using a digital signal processor comprising the steps of:
    applying AC coupling to a received data signal, wherein a cutoff frequency of the AC coupling is set to less than 1 MHz for a first predetermined time period and the cutoff frequency is changed to 10 MHz for a second predetermined time period, wherein automatic gain control is performed to the signal during the first predetermined time period;
    computing a DC offset error after applying DC coupling to the signal;
    correcting the received signal;
    filtering the signal to remove any DC offset values; and
    receiving error protected data as a result of the applying AC coupling, applying DC coupling, correcting, and filtering.

24. The method as in claim 23 wherein the gain is changed a plurality of times during said second predetermined time period.

25. The method as in claim 24 wherein the error protected data is received within 8 microseconds of activating the receiver and applying AC coupling.

* * * * *